(No Model.)

N. WEBER.
MACHINE FOR STRETCHING, SCRAPING, AND FINISHING HIDES.

No. 395,727. Patented Jan. 8, 1889.

WITNESSES.
A. D. Harrison.
W. C. Ramsay.

INVENTOR
N. Weber
by Wright Brown Roseley
Attys.

United States Patent Office.

NICHOLAS WEBER, OF LYNN, MASSACHUSETTS.

MACHINE FOR STRETCHING, SCRAPING, AND FINISHING HIDES.

SPECIFICATION forming part of Letters Patent No. 395,727, dated January 8, 1889.

Application filed May 14, 1888. Serial No. 273,795. (No model.)

*To all whom it may concern:*

Be it known that I, NICHOLAS WEBER, of Lynn, in the county of Essex and State of Massachusetts, have invented certain new and useful Improvements in Machines for Stretching, Scraping, and Finishing Hides or Skins, of which the following is a specification.

This invention relates to machines in which two jaws are employed to act on opposite sides of a hide or skin, as shown in the reissued patent to Jesson, dated August 23, 1887, No. 10,860, the upper jaw being a roll of yielding material and the lower jaw a scraping blade or blades arranged to press a skin against the yielding roll. The jaws are reciprocated in unison, and are closed upon the skin during their movement in one direction and opened to release the skin during their movement in the opposite direction. The skin is held at one end by the operator, so that when the jaws are closed they will move upon the skin and thereby exert a stretching action thereon, the under jaw, which is in contact with the flesh side of the skin, having a scraping action thereon, which removes the superfluous matter, and in connection with the stretching action makes the skin soft and pliable.

My invention consists in a polishing-blade attached to the holder which carries the roll or upper jaw, and arranged to bear on the grain-surface of the skin near the point where the skin is grasped by the jaws, said blade operating to smooth and brighten said grain-surface, as I will now proceed to describe.

Figure 1:
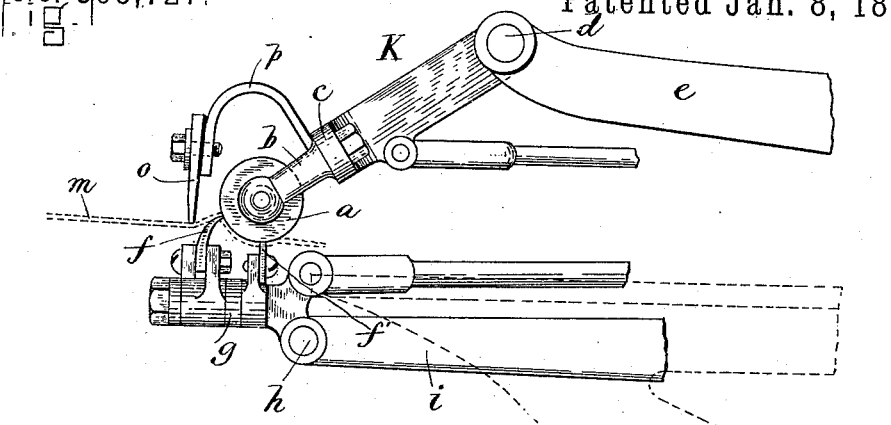
Figure 2:
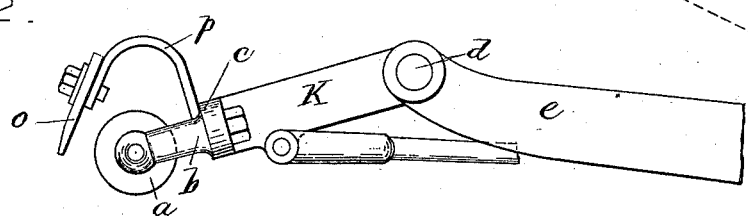
Figure 3:
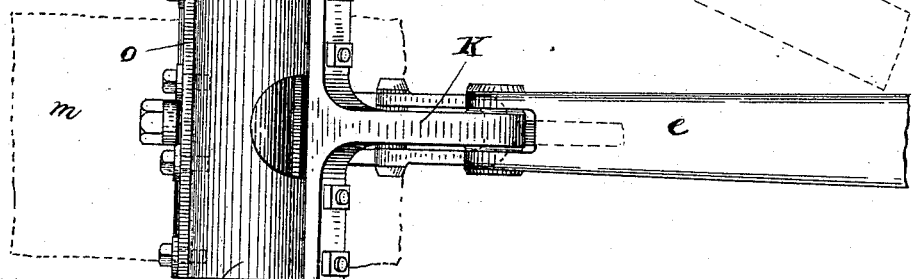

Of the accompanying drawings, forming a part of this specification, Figure 1 represents a side elevation of the two jaws and portions of their operating devices, together with the finishing-blade, the jaw being closed upon the skin. Fig. 2 represents a similar view showing the jaws opened. Fig. 3 represents a top view.

The same letters of reference indicate the same parts in all the figures.

In the drawings, $a$ represents the upper jaw, which, in this instance, is a roll of yielding material journaled in bearings or arms $b$ $b$, which are attached to a cross-bar, $c$, on a lever, K, which lever is pivoted at $d$ to an arm, $e$, on a reciprocating carrier.

$f$ represents a sharp-edged blade constituting the lower jaw or scraper and attached to a holder, $g$, which is pivoted at $h$ to an arm, $i$, on the reciprocating carrier above referred to. A blunt-edged blade, $f'$, is preferably attached to said holder to remove wrinkles from the skin in advance of the scraping-jaw $f$. The two jaws are closed upon a skin, $m$, as shown in Fig. 1, while the carrier and the jaws are moving in one direction, and are opened and separated from the skin, as shown in Fig. 2, while the carrier is moving in the opposite direction, the organized machine being provided with mechanism whereby the jaws are alternately opened and closed. Suitable mechanism for this purpose is shown and described in the above-named Jesson patent, to which reference may be had for a fuller description. The operator holds the skin while the jaws are moving in their closed condition, so that the jaws move upon and stretch the skin, the under jaw scraping the flesh side of the skin at the same time, as above described.

In carrying out my invention I secure to the holder K of the roll or upper jaw a blade, $o$, of any suitable material, adapted when rubbed upon the grain-surface of a skin to impart a finish or burnish thereto. I prefer to make said blade of vulcanized fiber; but it may be made of any hard and close-grained wood, or of hard rubber, or of any other suitable material.

The blade is arranged to bear upon the upper surface of the skin near the point where the skin is grasped by the jaws, its lower edge projecting below the upper edge of the lower jaw or scraper, so that it will deflect the skin and exert a suitable pressure thereon, as shown in Fig. 1, the outer end of the skin being held by the operator against a bolster or cushion on the bed or table of the machine, as shown in the Jesson patent.

The blade $o$ may be secured to the upper jaw-holder by any suitable means. I have here shown an arched plate, $p$, as the securing device, one end of said plate being bolted to the cross-bar $c$ of the lever K and the other end to the blade $o$.

It will be seen that while the closed jaws are moving on the skin the finishing-blade $o$ is imparting a finish or luster to the grain-surface. Heretofore it has been the invariable custom, so far as I am aware, to impart a finish to skins after they have been stretched and softened by a blade attached to a handle and rubbed over the skin by the muscular force of a workman.

By combining the blade with the jaws, which stretch and soften the skin, I cause both operations to be performed at once and by one machine, thus materially reducing the expense of preparing skins for use.

I do not limit myself to the means described in the Jesson patent for opening and closing the jaws, nor to the specific construction of jaws herein shown, it being obvious that the blade $o$ may be used with reciprocating and opening and closing jaws of any suitable construction.

I claim—

The combination, in a leather scraping and stretching machine, of the yielding jaw or roll $a$, arranged to bear on the grain side of a skin, a scraping-jaw arranged to bear on the opposite side of the skin, holders for said jaws, the finishing or polishing blade secured to the holder of the yielding jaw or roll and arranged to bear on the grain side of a skin at one side of the line of contact of the said jaws with the skin, and mechanism for reciprocating and opening and closing said jaws, whereby the finishing-blade is caused to rub and polish the grain side of the skin while said jaws are closed thereon, as set forth.

In testimony whereof I have signed my name to this specification, in the presence of two subscribing witnesses, this 9th day of May, A. D. 1888.

NICHOLAS WEBER.

Witnesses:
C. F. BROWN,
W. C. RAMSAY.